United States Patent
Robbins et al.

(10) Patent No.: US 9,036,812 B2
(45) Date of Patent: May 19, 2015

(54) METHOD AND APPARATUS FOR SELECTING COMMUNICATION IDENTIFIERS

(75) Inventors: William Stanley Robbins, Sun Prairie, WI (US); Anup D Karnalkar, Allen, TX (US); R. Tyler Wallis, Greenwood Village, CO (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 1930 days.

(21) Appl. No.: 12/113,394

(22) Filed: May 1, 2008

(65) Prior Publication Data

US 2009/0274285 A1    Nov. 5, 2009

(51) Int. Cl.
| | |
|---|---|
| *H04M 1/00* | (2006.01) |
| *H04M 1/2745* | (2006.01) |
| *H04M 3/493* | (2006.01) |
| *H04M 3/42* | (2006.01) |
| *H04M 7/00* | (2006.01) |

(52) U.S. Cl.
CPC .. *H04M 1/274566* (2013.01); *H04M 1/274516* (2013.01); *H04M 3/4935* (2013.01); *H04M 3/42102* (2013.01); *H04M 7/006* (2013.01); *H04M 2207/14* (2013.01)

(58) Field of Classification Search
CPC .................. H04M 1/274566; H04M 1/72519; H04M 3/42059; H04M 1/271; H04M 2001/274541; H04M 3/44; H04M 1/23; H04M 3/42102; H04W 76/02
USPC ............ 379/355.01, 355.02, 355.07, 355.08, 379/142.05, 207.14, 216.01, 281, 286, 339
See application file for complete search history.

(56) References Cited

U.S. PATENT DOCUMENTS

| | | | |
|---|---|---|---|
| 6,330,442 B1 * | 12/2001 | Seppanen ................... 455/426.1 |
| 2002/0137549 A1 * | 9/2002 | Porter ........................... 455/564 |
| 2005/0157857 A1 | 7/2005 | Lockwood | |
| 2006/0177039 A1 | 8/2006 | Caballero-McCann et al. | |
| 2009/0296691 A1 * | 12/2009 | Clifford et al. ................ 370/352 |

* cited by examiner

*Primary Examiner* — Akelaw Teshale
(74) *Attorney, Agent, or Firm* — Guntin & Gust, PLC; Ralph Trementozzi (57) ABSTRACT

A system that incorporates teachings of the present disclosure may include, for example, a communication device having a controller to retrieve a targeted party telephone number, retrieve a telephone number assigned to the communication device, submit to a system at least a portion of the targeted party telephone number and at least a portion of the telephone number assigned to the communication device, receive from the system information indicating a dialing format for the targeted party telephone number, and initiate communications according to the information supplied by the system. Other embodiments are disclosed.

24 Claims, 7 Drawing Sheets

METHOD AND APPARATUS FOR SELECTING COMMUNICATION IDENTIFIERS

FIELD OF THE DISCLOSURE

The present disclosure relates generally to utilization of communication identifiers and more specifically to a method and apparatus for selecting communication identifiers.

BACKGROUND

Some telecommunication service providers may require their subscribers to use different dialing formats. Possible domestic dialing formats in the United States (US) can include an eleven digit dialing format, a ten digit dialing format, and a seven digit dialing format. In other parts of the world, telecommunication service providers can similarly require their subscribers to use a variety of dialing formats. As networks evolve throughout the world service providers may further vary communication identifier formats.

DETAILED DESCRIPTION

One embodiment of the present disclosure entails a communication device having a controller to retrieve a targeted party telephone number, retrieve a telephone number assigned to the communication device, submit to a system at least a portion of the targeted party telephone number and at least a portion of the telephone number assigned to the communication device, receive from the system information indicating a dialing format for the targeted party telephone number, and initiate communications according to the information supplied by the system.

Another embodiment of the present disclosure entails a computer-readable storage medium having computer instructions for receiving from a first communication device at least a portion of a second communication identifier, and determining a dialing format for the second communication identifier from the received portion of the second communication identifier and at least a portion of a first communication identifier of the first communication device.

Yet another embodiment of the present disclosure entails a method involving supplying a system at least a portion of first and second telephone numbers to determine a dialing format of the second telephone number.

Figure 1:
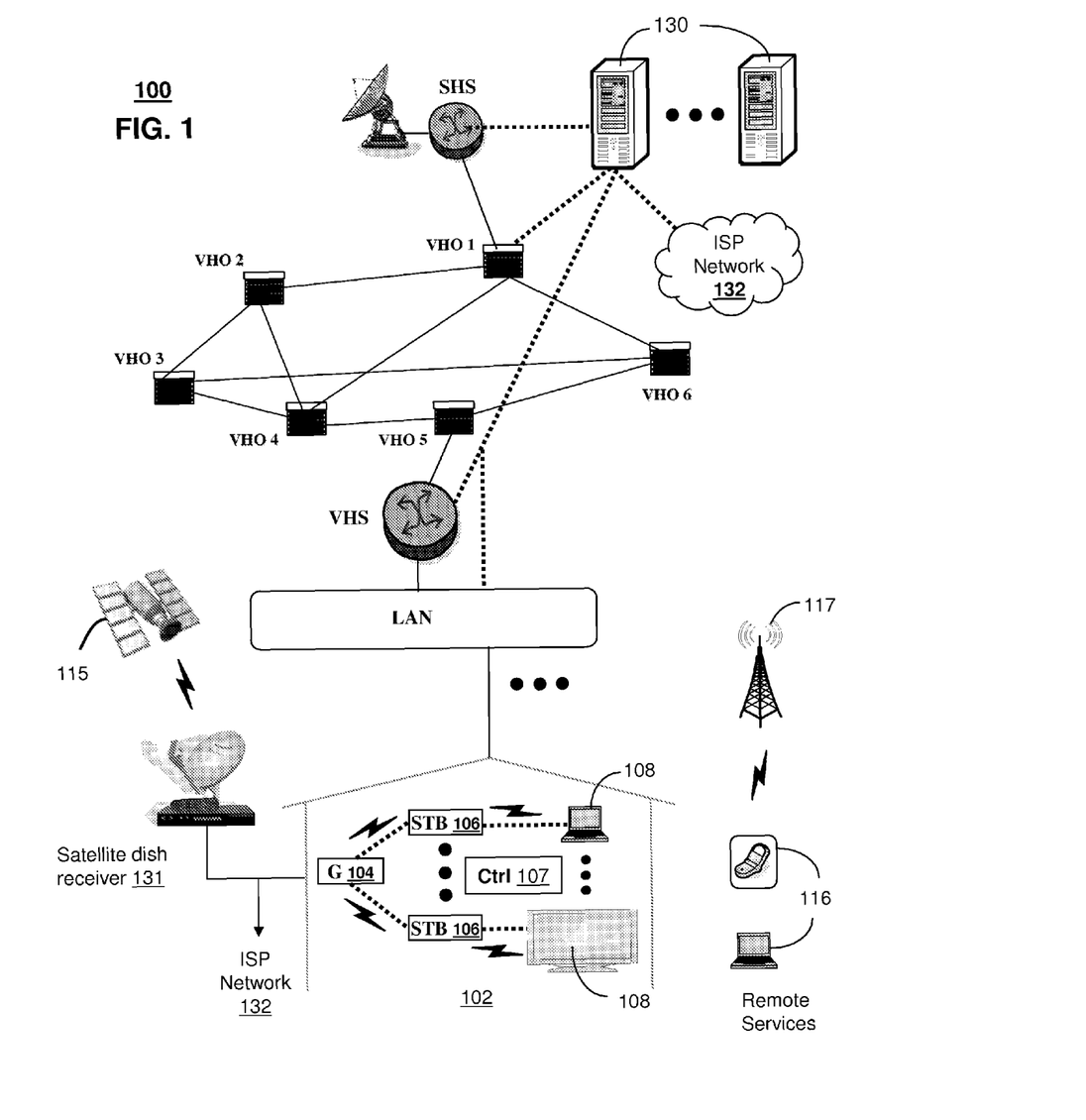
FIGS. 1-4 depict exemplary embodiments of communication systems that provide media services.

FIG. 1 depicts an exemplary embodiment of a first communication system 100 for delivering media content. The communication system 100 can represent an Internet Protocol Television (IPTV) broadcast media system. In a typical IPTV infrastructure, there is at least one super head-end office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via a local area network (LAN) to commercial and/or residential buildings 102 housing a gateway 104 (e.g., a residential gateway or RG). The LAN can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.). Another distinct portion of the one or more computing devices 130 can be used as a dialing format system 130 for determining dialing formats of communication identifiers supplied by communication devices (e.g., cell phone, STB, computer, etc.) operating in the first communication system 100.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
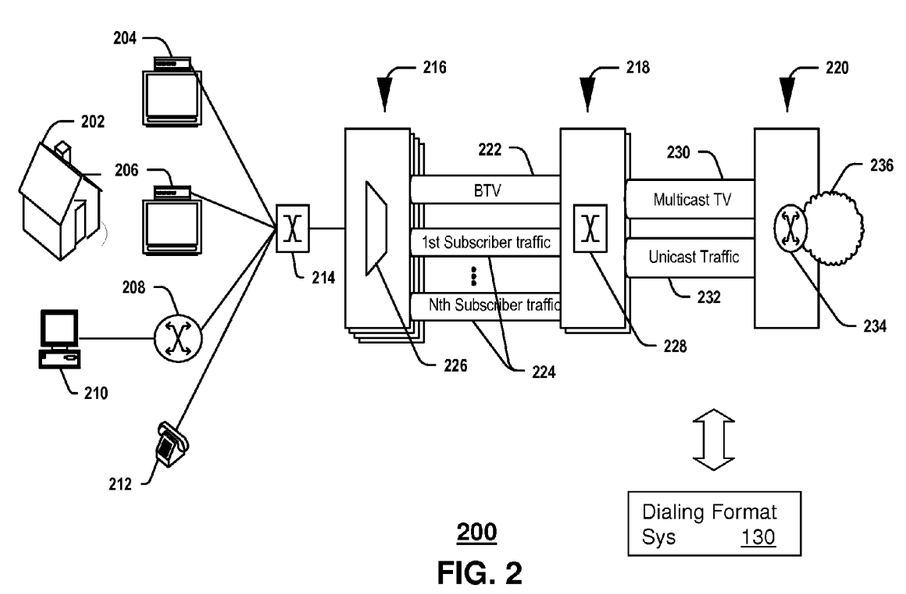

FIG. 2 depicts an exemplary embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remote control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

The dialing format system 130 of FIG. 1 can be operably coupled to the second communication system 200 for purposes similar to those described above.

Figure 3:
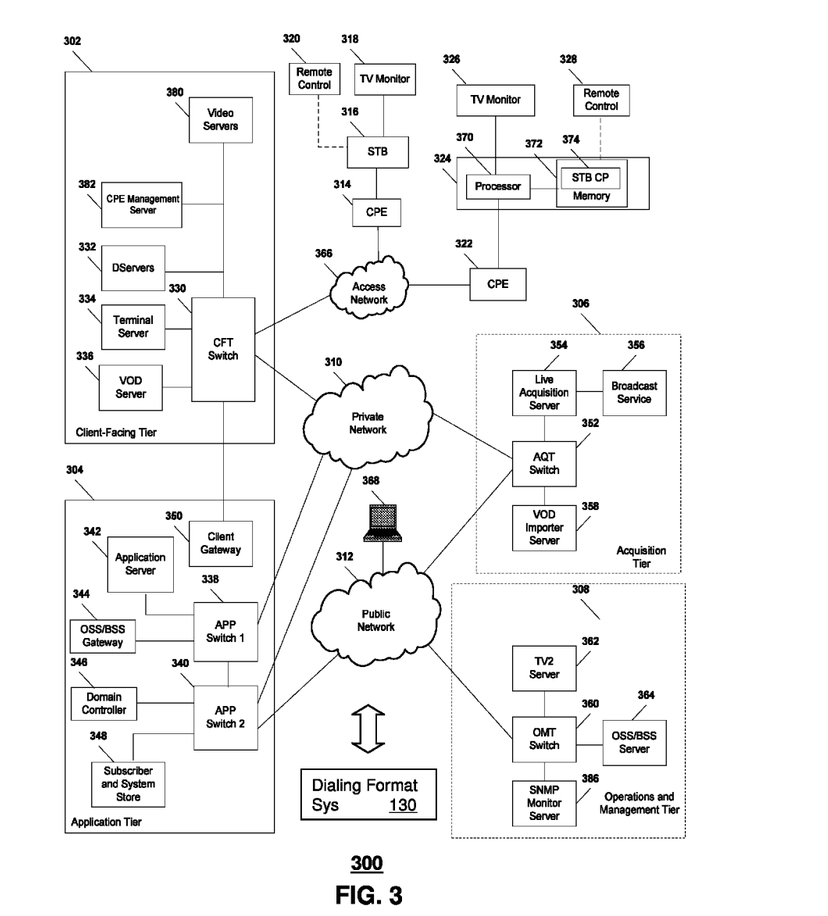

FIG. 3 depicts an exemplary embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 322.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an exemplary embodiment, the client-facing tier 302 can be coupled to the CPE 314, 322 via fiber optic cables. In another exemplary embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

The dialing format system 130 of FIGS. 1-2 can be operably coupled to the third communication system 300 for purposes similar to those described above.

It should be apparent to one of ordinary skill in the art from the foregoing media communication system embodiments that other suitable media communication systems for distributing broadcast media content as well as peer-to-peer exchange of content can be applied to the present disclosure.

Figure 4:
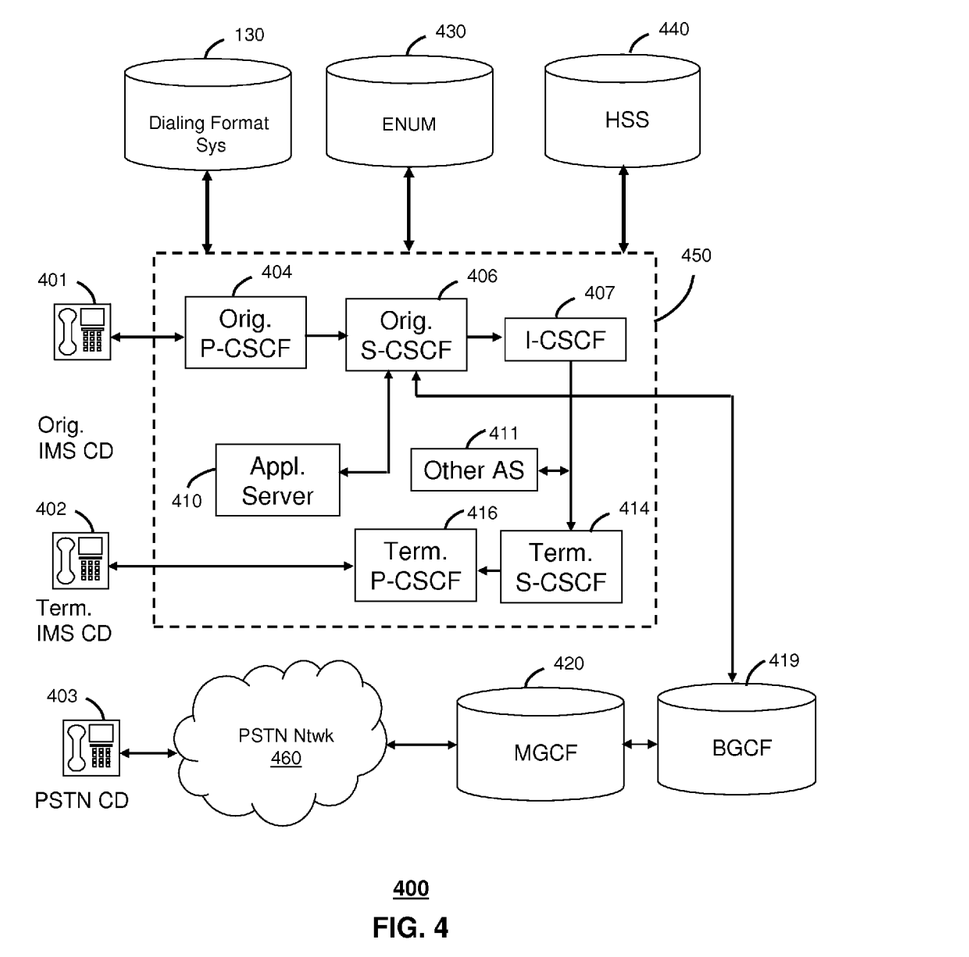

FIG. 4 depicts an exemplary embodiment of a communication system 400 employing an IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) supported by the HSS 440. To accomplish a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating S-CSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

IMS network 450 can also be operably coupled to the dialing format system 130 previously discussed for FIG. 1. In this representative embodiment, the dialing format system 130 can be accessed over a PSTN or VoIP channel of communication system 400 by common techniques such as described above.

Figure 5:
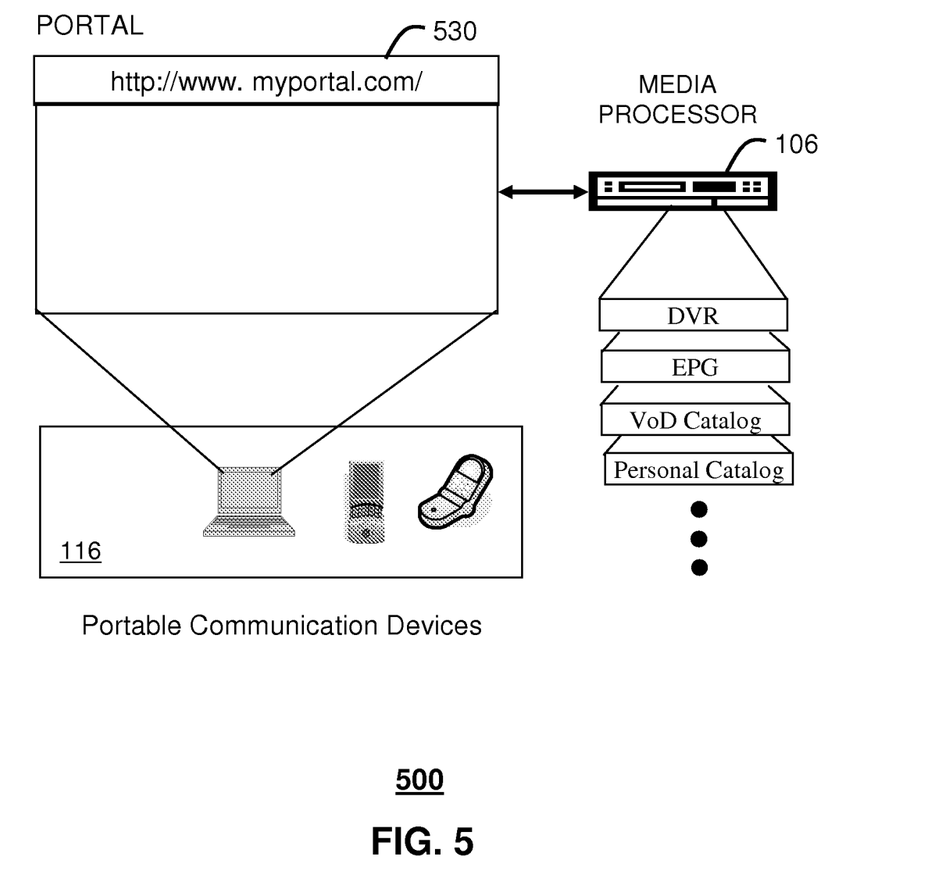
FIG. 5 depicts an exemplary embodiment of a portal interacting with at least one among the communication systems of FIGS. 1-4.

FIG. 5 depicts an exemplary embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VoD catalog, a personal catalog stored in the STB (e.g., personal videos, pictures, audio recordings, etc.), and so on.

Figure 6:
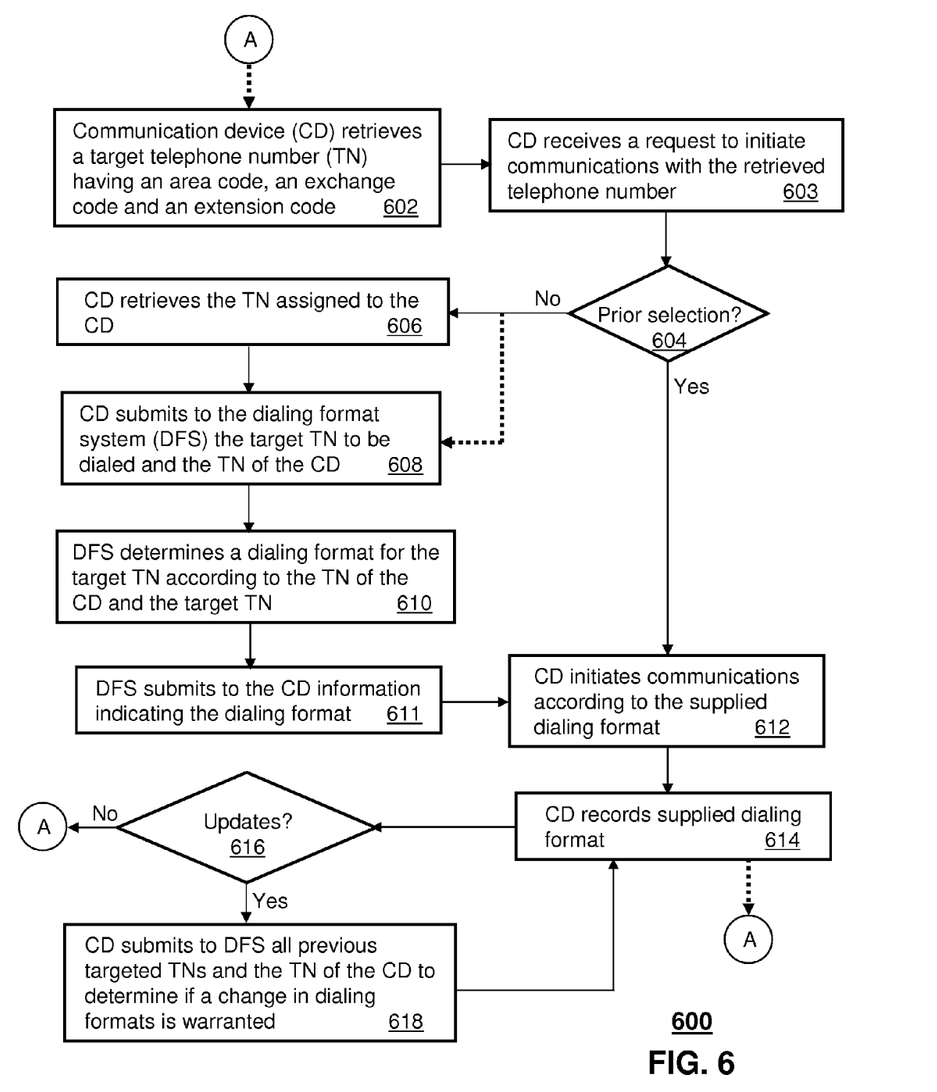
FIG. 6 depicts an exemplary method operating in portions of the communication systems of FIGS. 1-4.

FIG. 6 depicts an exemplary method 600 operating in portions of communication systems 100-400. Method 600 begins with step 602 in which a communication device (such as a cordless phone, VoIP terminal, cell phone, STB, or portable computer used as for example a soft phone operating in the media communication systems of FIGS. 1-4) retrieves a telephone number having an area code, an exchange code and an extension code (e.g., 222-333-4444). The area code (222) can identify a geographic area associated with the telephone number. The exchange code (333) can identify a central office which supplies telecommunication services to the subscriber of the telephone number. The extension code (4444) can uniquely identify a subscriber from other subscriber telephone numbers.

In other parts of the world (e.g., Europe, Asia, Middle East, etc.), a telephony dialing format can differ from the above illustration. Nonetheless, the principles described in the present disclosure can be applied to any communication identifier format of any region in the world where communication identifier formats vary according to telecommunication service provider operating policies.

Referring back to step 602, the telephone number can be retrieved as directed by a user of the communication device from a communication log, an address book, an email, a voicemail message, a short messaging service (SMS) message, a multimedia messaging service (MMS) message, one or more telephony databases (e.g., Yellow Pages™, White Pages™, a database of movie theaters, etc.), or a web page, just to mention a few. The telephone number can be highlighted by the communication device in a user interface as a selectable number that can invoke a process for initiating communications with another communication device assigned to the selected telephone number. In step 603, the communication device receives a request from the user to initiate communications according to the selected telephone number. This step can be invoked by selecting a common control button on the communication device for initiating communications (e.g., "Send", "Talk", "Call", etc.), or touching the selected telephone number on a touch-screen-equipped communication device.

In step 604, the communication device can determine if the telephone number has been used previously with a dialing format supplied by the Dialing Format System (DFS) 130 according to method 600. If it has not been previously used, the communication device proceeds to step 606 where it retrieves the telephone number assigned thereto, and submits to the DFS 130 in step 608 at least a portion of the telephone number retrieved in step 602 and at least a portion of its telephone number. The portions submitted to the DFS 130 can be for example the area code and exchange code of each telephone number. The telephone number assigned to the communication device can for example represent a fixed line telephone number assigned to a residence or commercial establishment. In another illustrative embodiment, step 606 can be skipped and instead the communication device can transmit the portion of the targeted telephone number to the DFS 130 and the DFS 130 can be programmed to determine the telephone number of the communication device from the communication session established therebetween. The DFS 130 can by way of the communication session for example retrieve a caller ID associated with the communication device.

In step 610, the DFS 130 can determine from the portion of the telephone number of the communication device and the portion of the selected telephone number a dialing format for the selected telephone number that complies with the service provider's requirements for the location from which the communication device is operating. The DFS 130 can make this determination from for example determining a geographic region for the telephone number of the communication device (e.g., by way of its area code) and central office policy (by way of the exchange code). The DFS 130 can further determine the geographic region and central office associated with the targeted telephone number. With this information, the DFS 130 can select a dialing format that conforms to the policy of the service provider providing services to the communication device initiating the call. Dialing format identified by the DFS 130 can be for example an 11 digit format, 10 digit format or 7 digit format.

Once the dialing format has been determined in step 610, the DFS 130 can submit to the communication device information indicating the dialing format of the targeted telephone number. The information can be delivered by way of a signal.

The signal can be an analog or digital signal that provides a telephone number corresponding to one of the dialing formats of the targeted telephone number such as for example an exchange plus extension code format (e.g., 333-4444). In another illustrative embodiment, the signal can provide a code which indicates to the communication device which dialing format to use (11, 10 or 7 digit format). In this embodiment, the communication device can construct a telephone number from the selected telephone number that conforms to the dialing format instructions supplied by the DFS 130 (e.g., a 7 digit format signal results in the construction of 333-4444).

Once the communication device has adapted the selected telephone number to the appropriate dialing format, the communication device proceeds to step 612 where it initiates communications with a called party according to the supplied dialing format. For convenience, the communication device can record in step 614 the telephone number conforming to the instructed dialing format. When the communication device retrieves the same telephone number in a subsequent event, the communication device can proceed from step 604 to step 612 and thereby skip a request to the DFS 130 for dialing format instructions.

Due to population growth and/or network reconfigurations, some service providers may from time to time update an existing dialing format. Additionally, the user of a communication device may need to move to a new location where a different service provider policy applies. To accommodate these changes, the communication device can be directed in step 616 by a user to update recorded dialing formats. If such an update is requested, the communication device can proceed to step 618 where it submits to the DFS 130 the recorded telephone numbers with the telephone number assigned to the communication device. Once the telephone numbers are adjusted as instructed by the DFS 130, the communication device once again records the adapted telephone numbers in step 614 for subsequent use. Accordingly, when the telephone number is retrieved in step 602 from any of the sources previously discussed, and the user attempts to call that telephone number in step 603, the communication device proceeds to step 604 where it determines that a prior selection was made, and the communication device proceeds to step 612 where it initiates communications according to the recorded dialing format.

Upon reviewing the aforementioned embodiments, it would be evident to an artisan with ordinary skill in the art that said embodiments can be modified, reduced, or enhanced without departing from the scope and spirit of the claims described below. For example, method 600 can be adapted to operate with any telephony system in the world in which telecommunication service providers require more than one dialing format. In another illustrative embodiment, method 600 can be adapted so that a communication identifier of the communication device is supplied to the DFS 130 in something other than a telephone number. The communication identifier can be for example a static Internet Protocol (IP) address of the communication device, a media access control number, a SIP URI, or some other unique form of identification. The DFS 130 can use this form of a communication identifier to index a database that provides it a corresponding telephone number.

In yet another embodiment, method 600 can be adapted so that communication logs, voicemail logs, or other sources of telephone phone numbers operating from the communication device are processed by the DFS 130 to determine an appropriate dialing format before telephone numbers are recorded by the communication device. Once a dialing format is identified by the DFS 130, the DFS can direct the communication device to record a telephone number in a call log, voicemail message, or otherwise in conformance with the identified dialing format. This way when a user selects a telephone number from one of these sources recorded in the communication device, the telephone number already has the correct dialing format and communications can be initiated immediately.

Other suitable modifications that can be applied to the present disclosure without departing from the scope of the claims below. Accordingly, the reader is directed to the claims section for a fuller understanding of the breadth and scope of the present disclosure.

Figure 7:
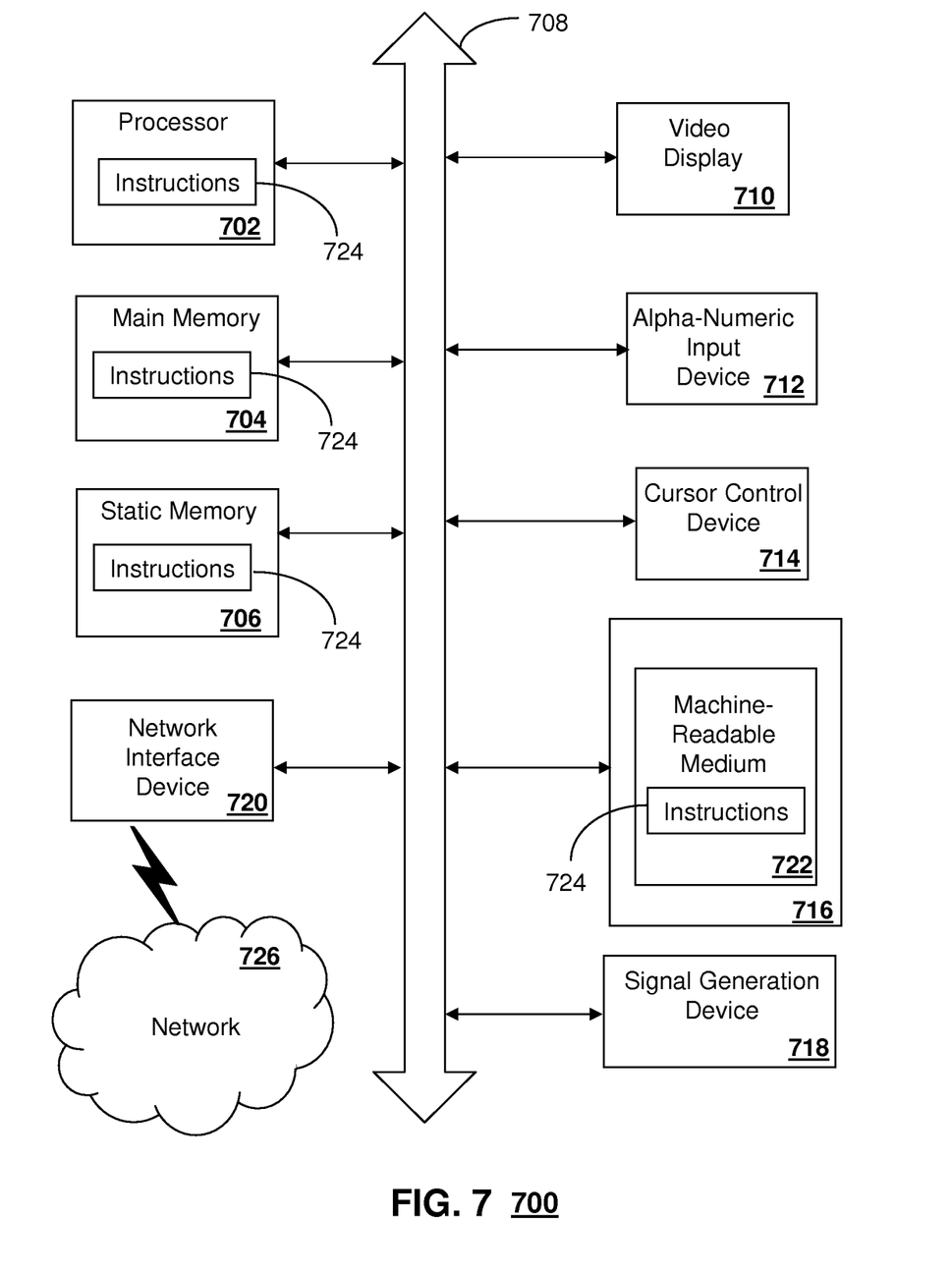
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communication device, comprising:
   a memory having computer instructions; and
   a controller coupled with the memory, wherein executing the computer instructions causes the controller to perform operations comprising:
      retrieving a targeted party telephone number;
      receiving a request for initiating communications from the communication device to the targeted party telephone number;
      determining whether prior communications were established between the communication device and a targeted communication device associated with the targeted party telephone number using a network compliant dialing format for the targeted communication device; and
      responsive to determining that the prior communications were not established using the network compliant dialing format for the targeted communication device:
         determining whether information indicating a dialing format for the targeted party was received;
         responsive to determining that the information indicating the dialing format for the targeted party was not received:
            retrieving, responsive to the request, a telephone number assigned to the communication device;
            submitting to a system, responsive to the request, at least a portion of the targeted party telephone number and at least a portion of the telephone number assigned to the communication device;

receiving from the system, in response to submission of the at least a portion of the targeted party telephone number and the at least a portion of the telephone number assigned to the communication device, information indicating a dialing format for the targeted party telephone number; and initiating communications with the targeted communication device according to the information supplied by the system; and responsive to determining that the information indicating the dialing format for the targeted party was received, initiating communications with the targeted communication device according to the information supplied by the system.

2. The communication device of claim 1, wherein the information comprises telephone number information corresponding to the dialing format of a plurality of dialing formats for the targeted party telephone number.

3. The communication device of claim 2, wherein executing the computer instructions causes the controller to perform operations comprising:
recording the information indicating the dialing format for the targeted party telephone number; and
initiating subsequent communications with the targeted party according to the recorded dialing format for the targeted party telephone number.

4. The communication device of claim 1, wherein the information comprises a signal indicating the dialing format for the targeted party telephone number.

5. The communication device of claim 4, wherein the signal comprises a code.

6. The communication device of claim 4, wherein executing the computer instructions causes the controller to perform operations comprising:
constructing a formatted telephone number according to the dialing format indicated by the signal; and
initiating communications according to the formatted telephone number.

7. The communication device of claim 6, wherein executing the computer instructions causes the controller to perform operations comprising:
recording the formatted telephone number to obtain a recorded, formatted telephone number; and
initiating subsequent communications according to the recorded, formatted telephone number.

8. The communication device of claim 1, wherein executing the computer instructions causes the controller to perform operations comprising:
submitting to the system over a packet switched network the portion of the targeted party telephone number and the portion of the telephone number assigned to the communication device; and
initiating communications according to the information supplied by the system over a circuit switched network.

9. The communication device of claim 8, wherein the packet switched network corresponds to an internet service provider network, and wherein the circuit switched network corresponds to a public switched telephone network.

10. The communication device of claim 1, wherein the dialing format comprises one of first, second and third dialing formats of the targeted party telephone number, wherein the first dialing format corresponds to a combination of a long distance code with an area code, an exchange code and an extension code of the targeted party telephone number, wherein the second dialing format corresponds to a combination of the area code, the exchange code and the extension code, and wherein the third dialing format corresponds to a combination of the exchange code and the extension code.

11. The communication device of claim 1, wherein executing the computer instructions causes the controller to perform operations comprising retrieving the targeted party telephone number from a source selected from a group of sources consisting of a communication log, an address book, a voicemail message, an email, a short messaging service message, a multimedia messaging service message, a telephony database, and a web page.

12. The communication device of claim 11, wherein the telephony database comprises a video database.

13. The communication device of claim 11, wherein executing the computer instructions causes the controller to perform operations comprising retrieving the targeted party telephone number responsive to detecting a selection from the source.

14. The communication device of claim 1, wherein the system determines a geographic region for at least one of the targeted party telephone number and the telephone number assigned to the communication device, and determines from at least one geographic region the dialing format for the targeted party telephone number.

15. The communication device of claim 1, wherein the communication device operates in a system selected from a group of systems consisting of: a cordless phone; an internet protocol television communication system; a cable television communication system; a satellite television communication system; a public switched telephone network; a voice over internet protocol communication system; and an internet protocol multimedia subsystem combining public switched telephone network and voice over internet protocol communication systems.

16. A non-transitory computer-readable storage medium, comprising computer instructions, which when executed by a processor causes the processor to perform operations comprising:
receiving from a first communication device at least a portion of a first communication identifier of the first communication device and at least a portion of a second communication identifier of a second communication device;
determining whether prior communications were established between the first communication device and the second communication device using a network-compliant dialing format for the second communication device; and
responsive to determining that the prior communications were not established using the network-compliant dialing format for the second communication device, determining from the portion of the second communication identifier of the second communication device and the first communication identifier of the first communication device, a network-compliant dialing format for the second communication identifier suitable for establishing networked communications between the first communication device and the second communication device.

17. The non-transitory computer-readable storage medium of claim 16, wherein the portion of the second communication identifier comprises at least two components of a group of telephony components comprising an area code, an exchange code, and an extension code.

18. The non-transitory computer-readable storage medium of claim 16, wherein responsive to executing the computer instructions, the processor performs operations comprising determining the portion of the first communication identifier from a communication session established with the first communication device.

19. The non-transitory computer-readable storage medium of claim 18, wherein the portion of the first communication identifier is selected from the group consisting of an internet protocol address, a media access control number, and session initiation protocol uniform resource identifier, and wherein responsive to executing the computer instructions, the processor performs operations comprising:
retrieving at least the portion of the first communication identifier including a telephone number assigned to the first communication device from a record associated with the first communication identifier; and
determining the dialing format for the second communication identifier from at least the portion of the telephone number.

20. The non-transitory computer-readable storage medium of claim 19, wherein responsive to executing the computer instructions, the processor performs operations comprising:
determining a geographic dialing region associated with the portion of the telephone number; and
determining the network-compliant dialing format for the second communication identifier from the geographic dialing region.

21. The non-transitory computer-readable storage medium of claim 16, wherein responsive to executing the computer instructions, the processor performs operations comprising submitting, to the first communication device, information indicating the network-compliant dialing format for the second communication identifier.

22. A method, comprising:
supplying, from a call-initiating communication device including a processor, to a system a target communication device telephone number;
determining, by the call-initiating device, whether prior communications were established between the call-initiating device and a target communication device identified by the target communication device telephone number; and
responsive to determining that the prior communications were not established between the call-initiating device and the target communication device:
supplying, from the call-initiating communication device, at least a portion of a first call-initiating communication device telephone number; and
receiving, at the call-initiating communication device, from the system a network-compliant dialing format of the target communication device telephone number determined by the system according to the first call-initiating communication device telephone number and the target communication device telephone number.

23. The method of claim 22, comprising:
initiating, by the call-initiating communication device, communications with a target communication device assigned to the target communication device telephone number according to the network-compliant dialing format of the target communication device telephone number.

24. The method of claim 22, wherein the call-initiating communication device operates in a system selected from a group of systems consisting of a cordless phone, an internet protocol television communication system, a cable television communication system, a satellite television communication system, a public switched telephone network, a voice over internet protocol communication system, and an internet protocol multimedia subsystem combining public switched telephone network and voice over internet protocol communication systems.

* * * * *